US005849119A

United States Patent [19]

Ishida et al.

[11] Patent Number: 5,849,119

[45] Date of Patent: Dec. 15, 1998

[54] PNEUMATIC TIRE INCLUDING ZIG-ZAG SUBGROOVES

[75] Inventors: Masahiro Ishida; Sadakazu Takei; Toshihiko Suzuki, all of Hiratsuka, Japan

[73] Assignee: The Yokohama Rubber Co., LTD., Tokyo, Japan

[21] Appl. No.: 651,244

[22] Filed: May 22, 1996

[30] Foreign Application Priority Data

May 25, 1995 [JP] Japan .................................... 7-126632

[51] Int. Cl.[6] ............................ B60C 11/03; B60C 11/12; B60C 115/00

[52] U.S. Cl. ................................. 152/209 R; 152/209 D; 152/DIG. 3

[58] Field of Search .......................... 152/209 R, 209 D, 152/DIG. 3; D12/146, 147, 148

[56] References Cited

U.S. PATENT DOCUMENTS

| | | | |
|---|---|---|---|
| D. 324,840 | 3/1992 | Maxwell et al. | D12/147 |
| D. 328,582 | 8/1992 | Covert et al. | D12/147 |
| D. 365,071 | 12/1995 | Hamamoto et al. | D12/149 |
| 2,551,238 | 5/1951 | Bohannon et al. | 152/209 R |
| 4,057,089 | 11/1977 | Johannsen | 152/209 R |
| 4,726,407 | 2/1988 | Hayakawa et al. | 152/209 R |
| 4,832,299 | 5/1989 | Matsumoto et al. | 152/209 R |
| 5,370,168 | 12/1994 | Boiocchi et al. | 152/209 R |
| 5,423,364 | 6/1995 | Himuro | 152/209 R |

FOREIGN PATENT DOCUMENTS

| | | | |
|---|---|---|---|
| 59-26306 | 2/1984 | Japan | 152/209 D |
| 121505 | 5/1988 | Japan | 152/209 R |
| 2136743 | 9/1984 | United Kingdom | 152/209 D |

*Primary Examiner*—Steven D. Maki
*Attorney, Agent, or Firm*—Nikaido, Marmelstein, Murray & Oram LLP

[57] ABSTRACT

Two or three main grooves, which extend in the circumferential direction of a tire, are provided in the central ground contacting region alone of a tread surface of the tire the rotational direction of which is designated to one direction, and at least one rib extending in the circumferential direction of the tire is formed between the main grooves. A plurality of sub-grooves respectively extending from the both sides of the main grooves outward in the widthwise direction of the tire up to at least the ground contacting ends of the tire are arranged at a predetermined pitch in the circumferential direction of the tire in such a manner that the sub-grooves formed in zigzag lines are inclined with the inner end portions thereof positioned on the forward side with respect to the rotational direction of the tire. The sub-grooves do not communicate with the main grooves but communicate with land portions separated by the sub-grooves. This enables pattern noise to be reduced without spoiling the drainage performance.

7 Claims, 1 Drawing Sheet

W
3
1B
CL
1A
1B
1
5
β
6
3b
α
α
3
R
5
3c
β
3b
T
3a
3a
3b
E
6
8
2
4
2
8
E

W
3
1B
CL
1A
1B
1
5
β
6
3b
α
3
R
5
3c
β
T
3b
3a
3a
3b
E
6
8
2
4
2
8
E 13
12a
11
R
13
T
E
12b
14
12b
E

PNEUMATIC TIRE INCLUDING ZIG-ZAG SUBGROOVES

BACKGROUND OF THE INVENTION

This invention relates to a pneumatic tire having a directive tread pattern, and more particularly to a pneumatic tire capable of reducing the noise ascribed to a tread pattern without spoiling the drainage performance on a wet road surface, and suitable for, especially, passenger cars.

Conventional pneumatic tires for passenger cars include, for example, a tire shown in FIG. 2. This tire is provided with four straight main grooves 12*a,* 12*b,* which extend in the circumferential direction T of the tire, in a tread surface 11 on which the rotational direction R of the tire is designated in one direction. A plurality of sub-grooves 13 provided at a predetermined pitch in the circumferential direction T of the tire extend from the both sides of two main grooves 12*a* in the ground contacting central region of the tire and beyond the ground contacting ends E of the tire as the sub-grooves cross the outer main grooves 12*b* and incline outward in the widthwise direction of the tire. These main grooves 12*a,* 12*b* and sub-grooves 13 define a plurality of blocks 14 on the tread surface 11, whereby a block pattern having a directivity is formed. The drainage performance of the tire is improved by providing a tread pattern having a directivity on the tread surface in this manner.

However, a pneumatic tire having such a directive tread pattern has a problem of pattern noise occurring due to the tread pattern.

In order to minimize this pattern noise, measures for distributing the frequencies, which constitute noise, by regulating the pitch variation, or measures for suppressing the occurrence of air column resonance and air pumping sound by reducing the number and effective area of the main grooves have been proposed.

However, the former method of regulating pitch variation has a noise reducing limit, and cannot constitute a drastic pattern noise reducing method. The latter method of reducing the number and effective area of the main grooves would cause the drainage performance on a wet road surface to be spoiled.

SUMMARY OF THE INVENTION

An object of the present invention is to provide a pneumatic tire capable of reducing pattern noise without causing the drainage performance on a wet road surface to be spoiled.

To achieve this object, the present invention provides a pneumatic tire formed by providing two or three main grooves, which extend in the circumferential direction of the tire, in the central ground contacting region alone of a tread surface of the tire the rotational direction of which is designated to one direction, forming a rib, which extends in the circumferential direction of the tire, between the main grooves, and arranging a plurality of sub-grooves, which respectively extend from the both sides of the main grooves outward in the widthwise direction of the tire up to at least the ground contacting ends of the tire, at a predetermined pitch in the circumferential direction of the tire in such a manner that each sub-groove formed in a zigzag line is inclined with the inner end portion thereof positioned on the forward side with respect to the rotational direction of the tire and not communicating with the main groove, and in such a manner that land portions separated by the sub-grooves are communicated.

Since the land portions separated by the sub-grooves extending in the widthwise direction of the tire are communicated with one another with the sub-grooves not communicated with the main grooves extending in the circumferential direction of the tire, the number of edges of the land portions which cause vibrational sounds and impact sounds can be smaller than in the case of a conventional block pattern-carrying tire. Therefore, the vibrational sounds and impact sounds caused by the edges of the land portions can be reduced.

Since as few as two or three main grooves extending in the circumferential direction of the tire are provided only in the central ground contacting region of the tire, air column resonance and air pumping sounds occurring due to these main grooves can be minimized.

Since each sub-groove is formed in a zigzag line, the air columns formed therein can be destroyed, i.e., the occurrence of air columns can be prevented. Accordingly, the sound pressure of noise in the sub-grooves can be lowered. This enables pattern noise occurring due to a tread pattern to be reduced, and the noise reducing performance to be improved.

Moreover, a directive tread pattern is formed on the tread surface of this tire by providing sub-grooves therein so that the sub-grooves respectively extend from the both sides of the main grooves outward in the widthwise direction of the tire up to the ground contacting ends of the tire while inclining the sub-grooves in the anti-rotational direction of the tire with 2–3 main grooves which extend in the circumferential direction of the tire formed in the central ground contacting region of the tire which has great influence upon the drainage performance. Therefore, a decrease in the drainage performance on a wet road surface can be held down within a practically permissible range. Namely, the drainage performance is not spoiled.

DESCRIPTION OF THE PREFERRED EMBODIMENTS

Figure 1:
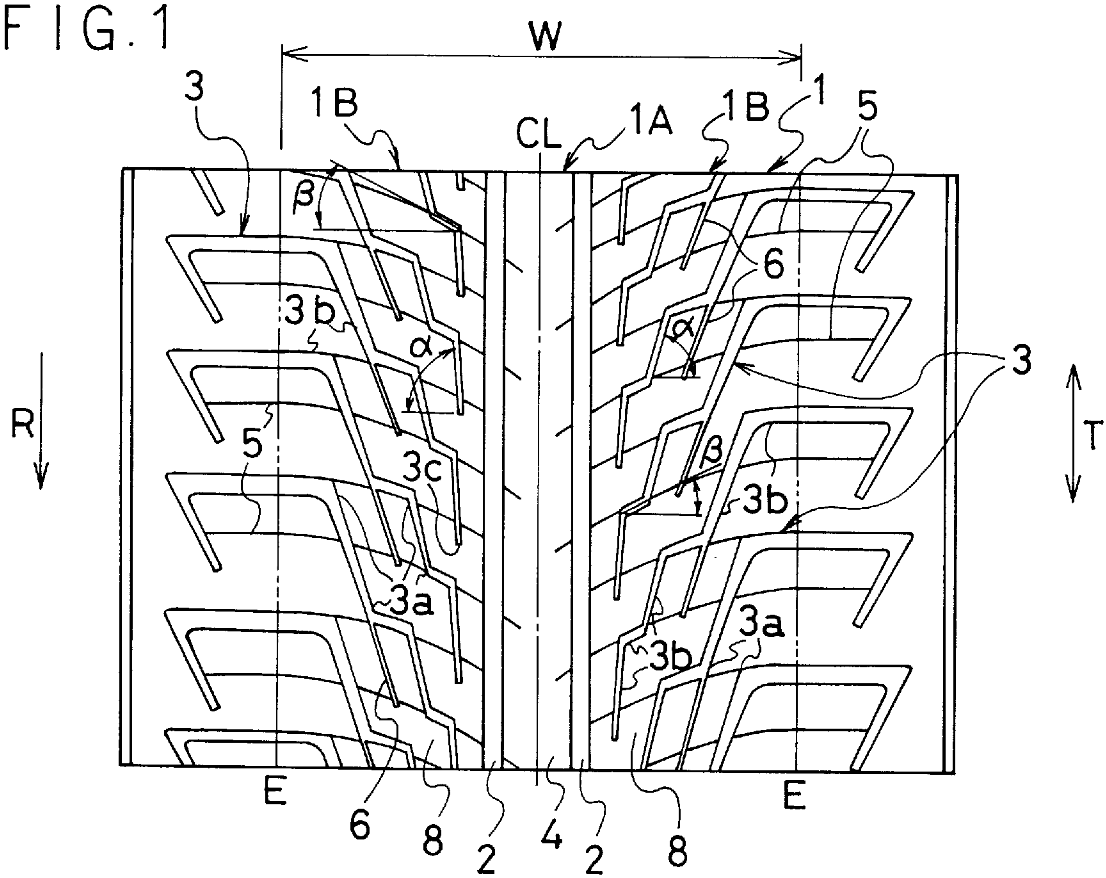
FIG. 1 is a development view of a principal portion of a tread surface of an example of the pneumatic tire according to the present invention.

Referring to FIG. 1, a reference numeral 1 denotes a tread surface, and the tire is designated so that it is rotated in a direction of an arrow R. In a central ground contacting region 1A of the tread surface 1 of the tire the rotational direction of which is designated to one direction, two main grooves 2 extending straight in the circumferential direction T of the tire and having the same width are provided in symmetrical positions with respect to a center line CL of the tire. These main grooves 2 are provided in the central ground contacting region 1A alone of the tire, and not in the other regions. Between these main grooves 2, a straight rib 4 extending in the circumferential direction T of the tire is formed.

In the side ground contacting regions 1B positioned on both sides of the central ground contacting region 1A of the tire, a plurality of sub-grooves 3 respectively extending from the both sides of main grooves 2 outward in the widthwise direction of the tire to positions beyond ground contacting ends E of the tire are provided at a predetermined pitch in the circumferential direction T of the tire. The sub-grooves 3 do not communicate with the main grooves 2, and they extend from positions in the vicinity of the both sides of the main grooves 2 with their inner end portions positioned on the forward side and inclined with respect to rotational direction R of the tire. Each sub-groove 3 is formed in a zigzag line. Each sub-groove 3 shown in the drawing is formed by connecting six straight sub-groove portions 3*b* via five bent portions 3*a* in the ground contacting region within the ground contacting ends E of the tire. The sub-groove portions 3*b* are connected so that an angle between adjacent sub-groove portions 3*b* becomes not less than 90°. In each side ground contacting region 1B of the tire, land portions 8 separated by the sub-grooves 3 communicate with each other. On the ground contacting region of the tread surface 1 of this tire, a directive tread pattern in which blocks are not provided is formed.

According to the present invention, the sub-grooves extending in the widthwise direction of the tire do not communicate with the main grooves 2 extending in the circumferential direction T of the tire, so as not to form blocks on the tread surface 1. Therefore, it becomes possible to provide fewer edges of land portions which cause vibrational sounds and impact sounds to occur than in the case of a conventional tire on which a block pattern is provided. Consequently, the levels of the vibrational sounds and impact sounds can be lowered.

Since as few as two main grooves 2 are provided in the central ground contacting region 1A alone of the tire, the air column resonance and air pumping sound which are caused by the main grooves 2 can be reduced.

Since the zigzag bent sub-grooves 3 are provided, the formation of air columns therein can be prevented, and the level of the sound pressure constituting noise in the sub-grooves 3 can be lowered. Accordingly, it becomes possible to provide lower pattern noise occurring due to the tread pattern, than in the case of a conventional tire, i.e., the noise reducing performance of the tire can be improved.

Since a directive tread pattern is formed on the tread surface by securing two main grooves 2, which extend in the circumferential direction of the tire, in the central ground contacting region 1A of the tire which has great influence upon the drainage performance thereof, and forming sub-grooves 3 so that the sub-grooves respectively extend from the both sides of the main grooves 2 outward in the widthwise direction of the tire up to the ground contacting ends E thereof as the sub-grooves are inclined in the antirotational direction of the tire, the drainage performance on a wet road surface is not spoiled.

In the above-described mode of embodiment, two main grooves 2 are provided, and it is possible to provide two or three main grooves in the central ground contacting region 1A of the tire. If the main groove 2 is provided singly, securing a satisfactory drainage performance on a wet road surface becomes difficult. Conversely, if not less than four main grooves 2 are provided, the level of sound pressure due to air column resonance increases with the increase in the number of the main grooves, so that the effect of the zigzag sub-grooves 3 is not reflected on the reduction of noise. The sum of the width of the main grooves 2 is preferably set to about 10–20% of a ground contacting width W of the tire.

The sub-grooves 3 are preferably formed so that each of them has three to five bent portions 3*a* in the ground contacting region, which extend between the ground contacting ends E, of the tire. If the number of the bent portions 3*a* is less than three, the effect in reducing the level of sound pressure in the sub-grooves becomes small. Conversely, if the number of the bent portions 3*a* exceeds five, the drainage performance on a wet road surface becomes lower than a level in the practically permissible range, and the level of sound pressure of the vibrational sounds and impact sounds occurring in the bent portions 3*a* increases.

The sub-groove potions 3*b* of the sub-grooves 3 are preferably formed so that an angle of inclination a with respect to the widthwise direction of the tire of odd-numbered sub-groove portions 3*b* counted from the inner ends 3*c* of the sub-grooves 3 is larger than that $\beta$ with respect to the widthwise direction of the tire of even-numbered sub-groove portions 3*b*. The angle of inclination $\alpha$ can be set to 45°–90°, and the angle of inclination $\beta$ 0°–30°. This enables the noise-reducing effect to be improved without spoiling the drainage performance.

The sub-groove portions 3*b* may also be curved instead of being formed linearly. In such a case, the angles of inclination $\alpha$, $\beta$ referred to above are measured with straight lines connecting both ends of the curved sub-groove portions 3*b* regarded as apparent sub-groove portions.

In order to enhance the drainage performance, preferably it should be met that each sub-groove portion 3*b* has a groove width gradually increasing towards the outer side of the tire in the widthwise direction of the tire.

In the above-described mode of embodiment of the present invention, it is preferable that a plurality of sipes 5 be provided in the tread surface 1 at a predetermined pitch in the circumferential direction T of the tire as shown in FIG. 1. Each sipe 5 extends from the inner side between the two main grooves 2 which is in the vicinity of the center line CL of the tire outward in the widthwise direction of the tire so as to cross one main groove 2. Each sipe 5 is curved inclininglywith its inner end portions positioned on the forward side with respect to the rotational direction R of the tire, and extends beyond the ground contacting end E of the tire as it crosses two inclined sub-grooves 3. Owing to the sipe 5 thus provided, the edge effect is improved to enable the tire to be used suitably even on a frozen snow-covered road surface. Therefore, this tire can be used suitably as a year-round tire.

When each sub-groove 3 is formed zigzag by connecting not less than four sub-groove portions 3*b* together in series so as to have not less than three bent portions 3*a*, a narrow groove 6 (narrower than the sub-groove 3) extending from the outermost odd-numbered sub-groove portion 3*b* toward a position on the forward side with respect to the rotational direction R of the tire may be provided so as not to communicate with an adjacent sub-groove 3 as shown in FIG. 1. The narrow groove 6 can communicate with an adjacent sipe 5.

In the above-described mode of embodiment of the present invention, the sub-grooves 3 on the left and right sides of the main grooves 2 are provided asymmetrically with respect to the circumferential direction T of the tire with the positions of the inner ends 3*c* staggered from one another. The sub-grooves may also be provided symmetrically by symmetrically positioning the inner ends 3*c* with respect to the circumferential direction of the tire.

The central ground contacting region 1A termed herein for purposes of the description of the present invention means such a portion of the tread surface 1 on each side of the tire center line CL in the tire width direction which corresponds in length to 15% of the ground contacting width W of the tire (thus, the central ground contacting region 1A as a whole corresponds in length to 30% of the ground contacting width W of the tire).

Example 1

Figure 2:
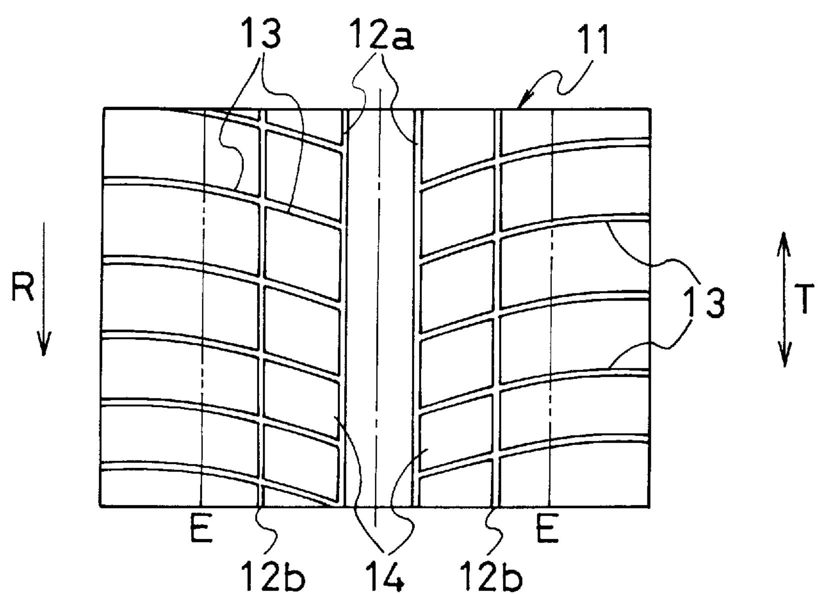
FIG. 2 is a development view of a principal portion of a tread surface of a conventional pneumatic tire.

A tire according to the present invention having the directive tread pattern shown in FIG. 1 with sipes and narrow grooves not provided, and a conventional tire having the block pattern shown in FIG. 2 were manufactured. Both of these tires have a size of 185/65R15. The area ratios of the grooves in the ground contacting regions of these two test tires are substantially the same.

These test tires were set on rims of a size of 15×6JJ, and the air pressure was set to 200 kPa. The resultant test tires were attached to 3000 cc front wheel drive passenger cars, and subjected to evaluation tests for the noise reducing performance and drainage performance under the following measuring conditions. The results shown in Table 1 were obtained.

Noise Reducing Performance

The inside-car noise due to pattern noise occurring while these passenger cars were made run linearly on a paved road surface at 40–80 km/h were evaluated by the driver's feeling, and the noise levels were measured. The results were evaluated by index values based on 100 which represented the noise reducing performance of the conventional tire. The larger value indicates higher noise reducing performance.

Drainage Performance

A critical speed at which a hydroplaning phenomenon occurred was measured by making the above-mentioned cars run on a test course of a flat wet road surface having an average depth of water of 10 mm along arcs of 100 m in radius with the running speed gradually increased. The results were evaluated by index values based on 100 which represented the drainage performance of the conventional tire. The larger value indicates higher drainage performance.

TABLE 1

| | Tire of the invention | Conventional tire |
|---|---|---|
| Noise reducing performance | 110 | 100 |
| Drainage performance | 95 | 100 |

As is clearly understood from Table 1, the tire according to the present invention can reduce pattern noise greatly without spoiling the drainage performance on a wet road surface. When the drainage performance is not lower than 95, it is within a practically permissible range, and poses no problems.

Example 2

Test tires 1–4 having a directive tread pattern shown in FIG. 1 in which sipes and narrow grooves are not provided, with the number of bent portions of the sub-groove set variously as shown in Table 2 were manufactured. The size of the tires is the same as that of the tires used in Example 1. The area ratios of the grooves in the ground contacting regions of the test tires are also substantially the same as those of the tires in Example 1.

These test tires were subjected to evaluation tests for the noise reducing performance and drainage performance under the same conditions as mentioned above, to obtain the results shown in Table 2.

TABLE 2

| | Test Tires 1 | Test Tires 2 | Test Tires 3 | Test Tires 4 |
|---|---|---|---|---|
| Number of bent portions | 1 | 3 | 5 | 7 |
| Noise reducing performance | 103 | 109 | 110 | 104 |
| Drainage performance | 97 | 96 | 95 | 94 |

It is understood from Table 2 that the number of the bent portions of each sub-groove may be set to 3–5 in order to improve the noise reducing performance greatly without spoiling the drainage performance on a wet road surface.

According to the present invention described above, the sub-grooves extending in the widthwise direction of the tire are provided so as not to communicate with the main grooves extending in the circumferential direction of the tire, whereby a block pattern is not formed on a tread surface. Accordingly, this tire does not have many edges unlike a conventional tire having block edges in the block pattern thereof. Therefore, the vibrational sounds and impact sounds occurring due to such edges can be reduced. Since as few as 2–3 main grooves are provided in the central ground contacting region alone of the tire, it becomes possible to hold down the air column resonance and air pumping which occur due to the presence of the main grooves. Since each sub-groove is formed in a zigzag line, the formation of air columns in the sub-grooves can be prevented, and the sound pressure level of the noise in the sub-grooves can be lowered. As a result, pattern noise constituting the noise occurring due to the tread pattern decreases as compared with that in a conventional tire, i.e., the noise reducing performance can be improved.

A directive tread pattern is formed on the tread surface of this tire by providing sub-grooves therein so that the sub-grooves respectively extend from the both sides of the main grooves outward in the widthwise direction of the tire up to the ground contacting ends of the tire while inclining the inner end portions of the sub-grooves in the rotational direction of the tire with two or three main grooves which extend in the circumferential direction of the tire formed in the central ground contacting region of the tire which has great influence upon the drainage performance. Therefore, the drainage performance of a wet road surface is not spoiled.

What is claimed is:

1. A pneumatic tire having a tread surface including:

two or three main grooves, which extend in the circumferential direction of said tire, in a central ground contacting region alone of the tread surface of said tire, the rotational direction of which is designated to one direction, at least one rib, which extends in the circumferential direction of said tire, between said main grooves, and a plurality of sub-grooves, which respectively extend from the both sides of said main grooves outward in the widthwise direction of said tire up to at least the ground contacting ends of said tire, at a predetermined pitch in the circumferential direction of said tire, wherein said sub-grooves are formed in zigzag lines inclined with the inner end portions thereof positioned on the forward side with respect to the rotational direction of said tire and not communicating with said main grooves, each of said sub-grooves extends in a zigzag line so as to have three to five bent portions, land portions separated by said sub-grooves are communicated, each of said sub-grooves is formed by connecting sub-groove portions together in series via said bent portions, an angle of inclination α with respect to the widthwise direction of said tire of an odd-numbered sub-groove portion counted from an inner end of each sub-groove being set larger than an angle of inclination β of an even-numbered sub-groove portion, said angle of inclination α of said odd-numbered sub-groove portion is 45°–90°, and said angle of inclination β of said even-numbered sub-groove portion being 0°–30°, narrow grooves are provided which extend from odd-numbered sub-groove portions of each sub-groove in widthwise outermost positions to forward positions in the rotational direction of said tire in both the left and right sides of the tread surface with respect to the tire center line, said narrow grooves not communicating with adjacent sub-grooves, each narrow groove having a width smaller than a width of said sub-groove.

2. A pneumatic tire according to claim 1, wherein each sub-groove portion has a groove width expanding towards the outer side of the tire in the widthwise direction of the tire.

3. A pneumatic tire according to claim 1, wherein a plurality of sipes are provided at a predetermined pitch in the circumferential direction of said tire so as to respectively extend from the both sides of said main grooves, communicate with said main grooves, and further extend outward in the widthwise direction of said tire while crossing said sub-grooves with inner end portions of said sipes inclined in the rotational direction of said tire.

4. A pneumatic tire according to claim 3, wherein each sipe extends to cross through an even-numbered portion of said sub-groove.

5. A pneumatic tire according to claim 1, wherein said main grooves extend straight.

6. A pneumatic tire according to claim 1, wherein said central ground contacting region of said tire comprises an area having a width of 30% of a ground contacting width of said tire, said area extending symmetrically leftward and rightward from the center line of said tread surface.

7. A pneumatic tire according to claim 1, wherein said two or three main grooves are arranged symmetrically with respect to a center line of the tire and have a collective total groove width of from 10% to 20% of the ground contacting width of the tire.

* * * * *